United States Patent
Monnerat et al.

(10) Patent No.: US 7,432,852 B2
(45) Date of Patent: Oct. 7, 2008

(54) METHOD OF SYNCHRONIZING BASE STATIONS OF A TERRESTRIAL CELLULAR COMMUNICATION NETWORK

(75) Inventors: Michel Monnerat, L'Union (FR); Arnaud Masson, Tournefeuille (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 11/617,078

(22) Filed: Dec. 28, 2006

(65) Prior Publication Data
US 2007/0165677 A1 Jul. 19, 2007

(30) Foreign Application Priority Data
Dec. 30, 2005 (EP) .................. 05301125

(51) Int. Cl.
H04B 7/19 (2006.01)
H04J 3/06 (2006.01)

(52) U.S. Cl. ............ 342/356; 342/357.01; 370/509; 455/13.2

(58) Field of Classification Search ............ 342/357.01, 342/357.06, 357.1, 356; 701/207, 213; 370/509; 455/13.2
See application file for complete search history.

(56) References Cited

U.S. PATENT DOCUMENTS

| | | | |
|---|---|---|---|
| 4,117,267 A * | 9/1978 | Haberle et al. | 370/324 |
| 4,688,216 A * | 8/1987 | Saburi | 370/216 |
| 6,925,292 B2 * | 8/2005 | Syrjarinne et al. | 455/255 |
| 2007/0135149 A1 * | 6/2007 | Sung et al. | 455/502 |

FOREIGN PATENT DOCUMENTS

| | | |
|---|---|---|
| EP | 1 411 648 A1 | 4/2004 |
| WO | WO 01/20818 A1 | 3/2001 |

* cited by examiner

*Primary Examiner*—Dao L Phan
(74) *Attorney, Agent, or Firm*—Sughrue Mion, PLLC

(57) ABSTRACT

The present invention relates to a method of synchronizing base stations of a terrestrial cellular communication system using a satellite component.

6 Claims, 3 Drawing Sheets

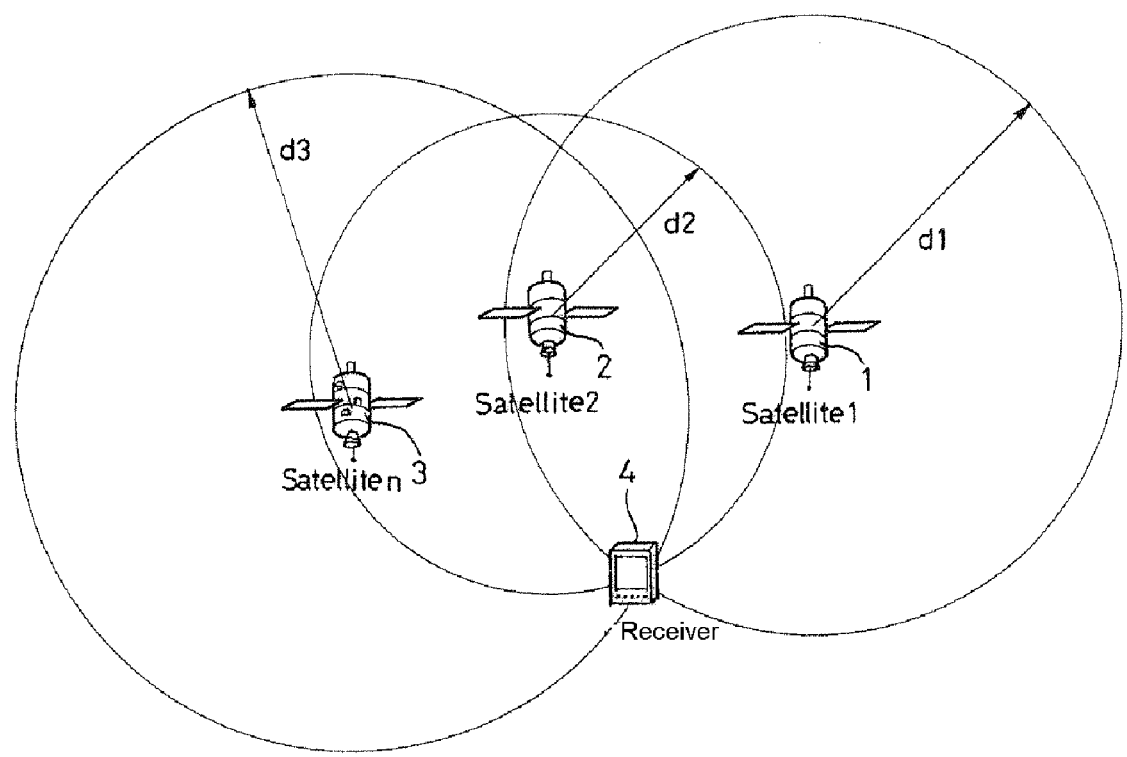

FIG_2
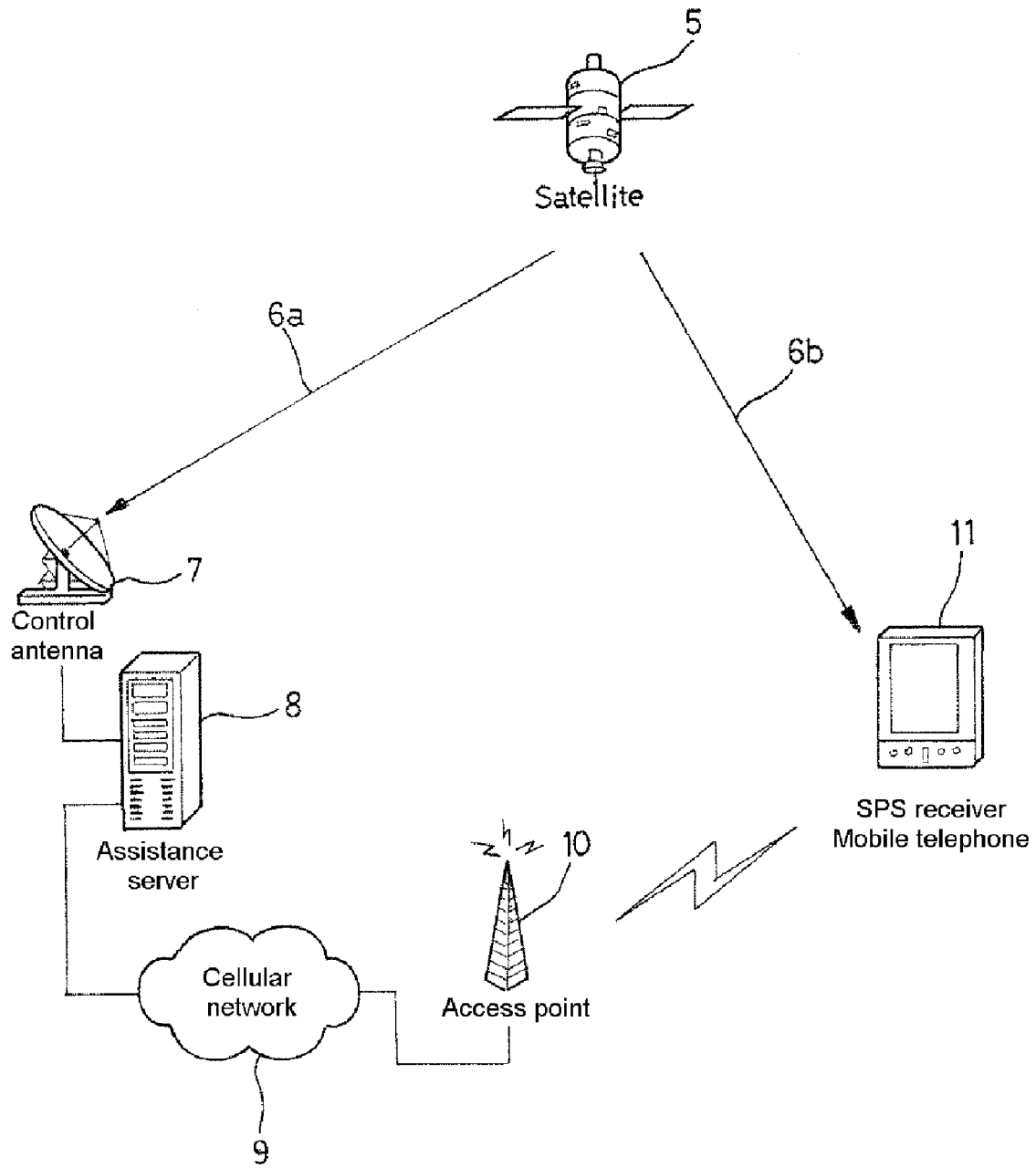

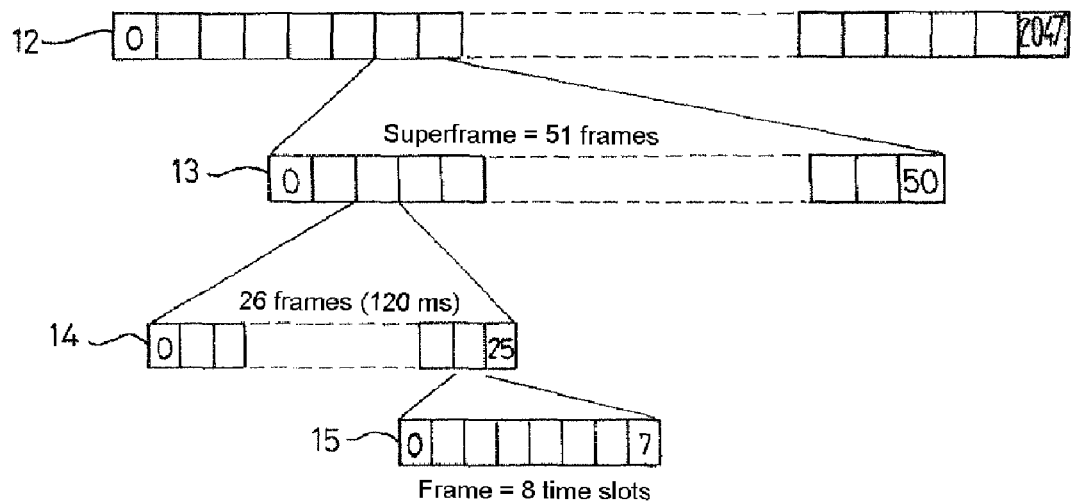
FIG_3
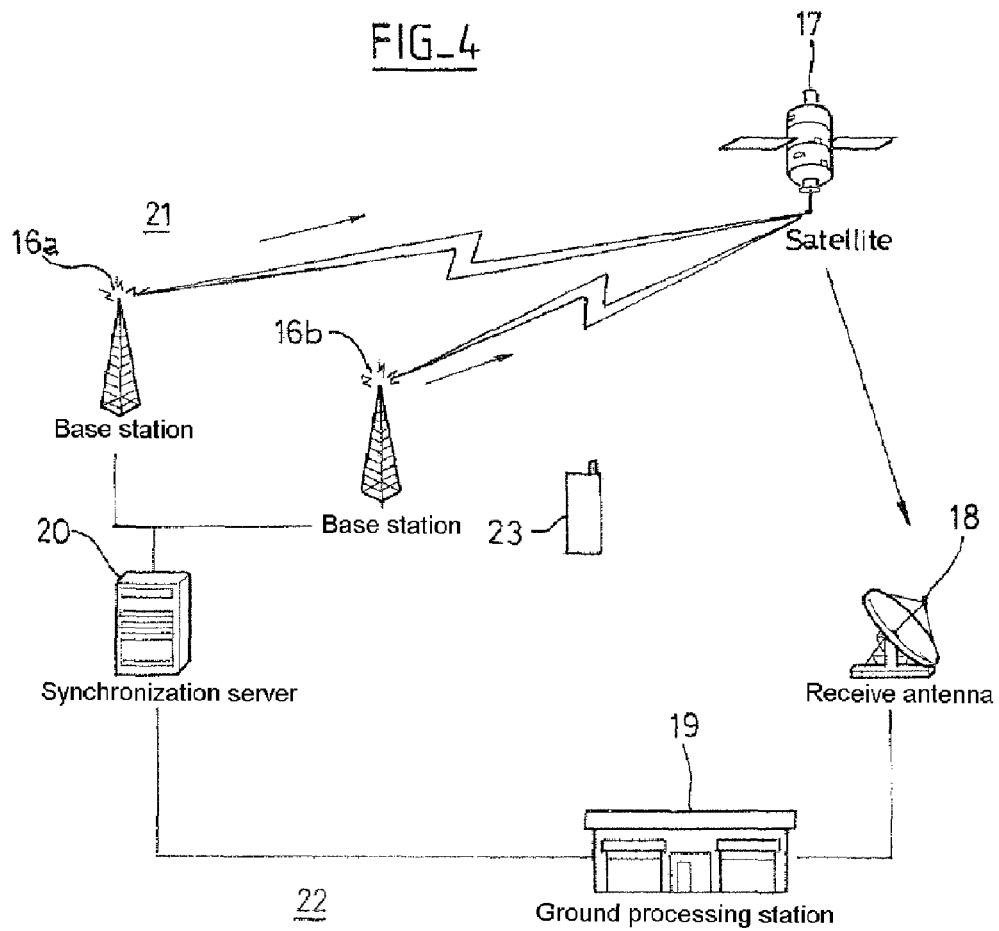
FIG_4

METHOD OF SYNCHRONIZING BASE STATIONS OF A TERRESTRIAL CELLULAR COMMUNICATION NETWORK

CROSS-REFERENCE TO RELATED APPLICATIONS

This application is based on French Patent Application No. 05301125.0 filed Dec. 30, 2005, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method of synchronizing base stations of a terrestrial cellular communication system using a satellite component. The objective of synchronizing the base stations is to locate or to assist with the location of the terminals of said communication system. Synchronization may be exploited in the use of techniques for assisting satellite positioning or techniques that work by triangulation of measurements effected directly on the signals transmitted by the base stations.

2. Description of the Prior Art

In a satellite positioning system utilizing GNSS (Global Navigation Satellite System) type receivers such as a GPS or Galileo receiver, the data signals enabling the receiver to calculate its position come from different satellites (at least four to determine the four unknowns x, y, z and t). It is well known by the man skilled in the art that positioning by such a system presupposes two types of processing in the receiver.

The first consists in acquiring the signal coming from at least four satellites, the second consists in evaluating the distance separating the receiver from the satellites from which the signal has been received. The interface between a radio navigation satellite system (RNSS) and the user receiver relies on a radio signal itself relying on a spread spectrum technique well known to the man skilled in the art. Spread spectrum techniques, in their most routine form such as the C/A code GPS, F/Nav Galileo, rely on the use of a periodic pseudo-random code. In the context of the GPS, that code has a period of 1 millisecond (ms). This code is added to a digital navigation message, that message including a certain number of items of information necessary for the calculation of the position of the receiver, typically:

- a time reference, well known in GPS under the name TOW (Time of Week) corresponding to the time of sending of the message,
- the position of the satellite at the time of the sending of the message, well known in GPS under the name ephemerides,
- certain corrections to be made to the onboard clock of the satellite, well known in GPS under the name clock corrections, aiming to correct the time reference relative to the global clock of the system,
- certain propagation correction parameters, such as parameters for correction of the propagation speed of electromagnetic waves in the layers of the atmosphere (in particular the ionosphere),
- the approximate position of the other satellites of the constellation via data known as almanacs.

The data bit rate is of course lower than the periodic spreading code bit rate. In the GPS SPS (GPS Satellite Positioning System) signal, the data bit rate typically rises to 50 bits per second, whereas that of the code is 1.023 million chips per second. A complete code being constituted of 1023 chips (i.e. 1 ms). All of the data added modulo 2 to the spreading code is transmitted on a carrier. In GPS, the carrier is typically at 1.57542 GHz.

The determination of the position of the receiver is represented in FIG. 1. The principle consists in a receiver [4] determining the distance separating it from at least three satellites of the constellation referenced by satellites [1], [2] and [3] (three satellites for location in two dimensions and four satellites for location in three dimensions). Once these distances [d1], [d2] and [d3] have been determined, the receiver can determine its position at the intersection of the spheres whose center is the position of each of the satellites themselves and whose radius is given by the distance [di]. The distance measurement is effected by measuring the time of arrival of a radio signal coming from the satellite. It follows that the essential information coming from the satellite via the navigation message that the receiver must process consists of the pair (sending TOW, position of the satellite at the time of sending). The satellite transmits in its navigation message its ephemerides (Keplerian parameters) enabling the receiver to calculate the position of the satellite in a frame of reference linked to the Earth. In the GPS case the ephemerides consist of 16 parameters.

| | |
|---|---|
| M0 | Mean anomaly |
| Dn | Mean displacement |
| E | Eccentricity |
| (A)1/2 | Root of half major axis |
| OMEGA 0 | Longitude of ascending node |
| I0 | Inclination |
| W | Argument of perigee |
| OMEGA DOT | Time derivative of right ascension |
| I DOT | Time derivative of inclination |
| Cuc | Cosine amplitude of harmonic of latitude argument correction term |
| Cus | Sine amplitude of harmonic of latitude argument correction term |
| Crc | Cosine amplitude of harmonic of orbit radius correction term |
| Crs | Sine amplitude of harmonic of orbit radius correction term |
| Cic | Cosine amplitude of harmonic of inclination angle correction term |
| Cis | Sine amplitude of harmonic of inclination angle correction term |

These parameters are repeated every 30 seconds in the navigation message.

The position of the satellite being obtained, it remains for the receiver to detect the time of sending of the message in order to deduce the propagation time of the wave and then the distance separating it from the satellite, and thus the radius of one of the three necessary spheres. As indicated hereinabove, the time also forms part of the content of the navigation message broadcast by the satellite. That time is repeated every 6 seconds. However, it is necessary to apply a satellite clock correction to the time read in the navigation message in order to transpose the transmitted time into a system reference common to all the satellites. This correction is transmitted every 30 seconds.

In conclusion, it is clearly apparent that a receiver can be in a position to determine its position only at the end of a minimum time of 30 seconds after having acquired the signal. The acquisition of the signal means the whole of the first operation to be effected by the receiver, which enables it to be synchronized in frequency and in time to the bit streams transmitted, an essential phase for the demodulation of the navigation message. For the receiver, acquisition consists in effecting a time-frequency search of the energy of the signal coming from the satellite. Locking onto the frequency of the signal from the satellite consists for the receiver in being tuned to the frequency at which the signal from the satellite is received. The receiver has three uncertainties leading it to effect this search:

Doppler effect linked to the mobility of the satellite,

Doppler effect linked to the mobility of the user, uncertainty linked to the accuracy of the receiver clock.

For the receiver, time locking consists in identifying a code transition in the received signal. The spreading code in the case of the GPS being periodic with a period of 1 ms, the time search is effected with a 1 ms horizon. Once the code transition has been identified, the man skilled in the art knows how to identify a bit transition and then the frame synchronization broadcast in the navigation message.

This time-frequency search is very costly in terms of receiver complexity and limits commensurately the performance of the receiver.

To summarize, the time taken by a receiver to provide a first position is constrained by a very costly first phase of seeking time-frequency synchronization and also by the reading of basic information in the navigation signal (greater than 30 s).

The method known to the man skilled in the art for alleviating this problem is known as Assisted GPS or Assisted GNSS. This method consists in coupling a cellular telecommunication system and a satellite navigation signal receiver. This method is described in FIG. 2. It assumes that the satellite navigation signal receiver is coupled to a cellular telecommunication receiver (terminal) [11]. A network equipment commonly called the assistance data server [8] listens continuously to the satellites of the satellite constellation via a radio signal [6a] and a control antenna referenced [7]. The information from the navigation message from each satellite is then stored by the server [8]. When the receiver [11] is searching for its position, it requests a certain number of items of assistance data by means of a call via a base station [10] of the cellular network [9] to the assistance data server. The assistance data is then returned by the server [8] to the receiver [11] via the base station [10]. This assistance data facilitates the processing of the signal [6b] received by the receiver [11] coming from the satellite [5] and confers on the receiver performance that is enhanced, inter alia, in terms of calculation time. In fact, the assistance data may be of the following type:

Content of the navigation message broadcast in the signals [6b] and [6a]. The content is returned at a bit rate much higher than the bit rate of the navigation message. The time taken to route the data essential to the determination of the position is therefore changed from 30 seconds to 1 to 2 seconds.

Pre-location of the receiver [11]. In fact, the receiver [11] being connected to the base station [10], the server [8] is in a position to know that the receiver is in the vicinity of the base station [10]. In a GSM type network, the dimension of the cells is typically less than 35 km.

A time reference. The server [8] receiving the data from the satellite [5] is in a position to know the satellite system time and therefore to broadcast it to the receiver [11]. Most cellular communication networks being asynchronous, the time reference transmitted can achieve an accuracy only of the order of 2 to 3 seconds.

Different types of corrections: propagation speed corrections, satellite onboard clock correction, local propagation correction, etc.

The knowledge of a pre-location, of the ephemerides of the satellites and of an approximate time reference enables the receiver to calculate the Doppler effect of the satellites in view, greatly reducing the uncertainty in terms of frequency to be swept during the acquisition phase. Similarly, the ephemerides of the satellites being known via the call to the server [8], it becomes unnecessary for the receiver [11] to demodulate this data in the navigation message [6b], which eliminates the constraint of 30 seconds previously highlighted for calculating the position. It then suffices for the receiver to determine a time event in the signal [6b] from the satellite, in other words to find the spreading code transition and then the transmitted time, the TOW in the GPS signal which recurs every 6 seconds. There is therefore clearly a significant improvement in performance, as much with regard to the time necessary for the calculation of a location point as with regard to the sensitivity. Sensitivity means the minimum power of the signal received by the receiver enabling it to perform adequate processing.

The assistance example is provided in a GSM type cellular network, it goes without saying that it may be extended to other systems such as WIFI, WIMAX type systems.

All the above communication systems are asynchronous, that is to say the base stations or access point do not have the same time reference, although they have a very stable clock, namely $5.10^{-9}$ according to the GSM (Global System for Mobile communications) standard. As indicated hereinabove, it is very difficult for an equipment of the communication network to provide accurately timed assistance to a terminal comprising a GNSS receiver coupled to a telecommunication transceiver. By "accurate" is meant a time accuracy better than one millisecond, enabling the terminal to find more easily a code transition in the satellite signal without ambiguity.

Moreover, the asynchronism of the base stations prevents the use of triangulation techniques on the telecommunication signals, well known to the man skilled in the art under the name TOA (Time of Arrival) or EOTD (Enhanced Observed Time Difference). Those techniques are derived from the location method employed on GPS type satellite systems by substituting the base stations for the satellites. The major difference therefore lies precisely in the fact that the GPS satellites are synchronous whereas the terrestrial base stations are not, rendering unsuccessful and impossible the techniques employed without an indispensable modification of the cellular telecommunication network.

A solution consists in equipping each access point with a GNSS or GPS device capable of sending to the equipment of the network the time offset (time shift) between the base station and the satellite location system. This method amounts to equipping the telecommunication network with location measurement units (LMU). It is known that such a device, in addition to calculating its position, determines time information with an accuracy better than one nanosecond. This information from the device is then used to time stamp the start of the frames sent by the base station equipped with the reference device. In fact, the system of frames transmitted by a base station is very regular and, according to the GSM standard, conforms to the representation given in FIG. 3. The message in fact consists of an uninterrupted succession of hyperframes [12], themselves consisting of superframes [13], themselves consisting of frames [14] and then time slots [15]. This regular succession enables logical channels used by each of the terminals and the services of the cellular communication network to be defined. It follows equally that the frame structure, because the clocks of the base stations are extremely accurate and regular, supplies stable timing information usable from the moment that one of the frame change events is identified relative to a universal time reference such as that provided by a GNSS or GPS system. In the system described hereinabove based on the use of LMU, the GPS or GNSS device equipping the base station fulfills precisely this function of providing a universal time reference. The information being centralized by an equipment of the network, it may be used to provide a terminal of the communication network with extremely accurate time information, of the order of one nanosecond.

This solution is extremely costly because of the deployment cost and the maintenance cost of such a system.

SUMMARY OF THE INVENTION

An object of the invention is therefore to remedy the drawbacks referred to hereinabove.

To this end, the invention consists in a method of synchronizing base stations of a terrestrial cellular telecommunication network, the network including at least first and second asynchronous base stations, which method includes the following steps:

a step of said first and second base stations sending to a telecommunication satellite a first message, respectively a second message, including a first frame synchronization word, respectively a second frame synchronization word, a step of retransmission by the satellite to a processing device on the ground of said first and second messages, the satellite and the processing device being synchronous with a reference time system of the GPS type, the following steps being executed within the processing device:

a step of searching for the first frame synchronization word sent in the message by the first base station, a step of searching for the second frame synchronization word sent in the message by the second base station, a step of apparent time stamping $T_{16a\text{-}Reception}$ of the first synchronization word and of apparent time stamping $T_{16b\text{-}Reception}$ of the second synchronization word, a step of calculating the distance between the first base station and the satellite, the processing device knowing the position of the first base station and the position of the satellite, a step of calculating the distance between the second base station and the satellite, the processing device knowing the position of the second base station and the position of the satellite, a step of calculation, by deduction from the distance calculated between the first base station and the satellite, of the routing time $T_{16a\text{-}Routing}$ to the satellite of the first synchronization word and of calculation by deduction from the distance calculated between the second base station and the satellite, of the routing time $T_{16b\text{-}Routing}$ of the second synchronization word, a step of calculation of the real TOW of the first synchronization word and of the real TOW of the second synchronization word, respectively in accordance with the formula $T_{16a}=T_{16a\text{-}Reception}-T_{16a\text{-}Routing}$ and the formula $T_{16b\text{-}Reception}-T_{16b\text{-}Routing}$, a step of transmission of information taking account of said real TOW to a synchronization device of the cellular telecommunication network.

One embodiment of the method according to the invention includes a step of transmission by the synchronization device of the cellular telecommunication network to a terminal of the information taking account of said real TOW between the base stations visible from the terminal, enabling it to effect a triangulation on the signals emanating from those base stations.

Other features and advantages of the invention will become more clearly apparent on reading the following description of particular nonlimiting embodiments of the invention given with reference to the appended drawings.

BRIEF DESCRIPTION OF THE DRAWINGS

FIG. 1, already described, represents the known method of determining the position of a receiver by GPS.

FIG. 2, already described, represents the known method of location by Assisted GPS or Assisted GNSS.

FIG. 3 represents the system of frames in the GSM standard.

FIG. 4 represents one embodiment of the system according to the invention.

DETAILED DESCRIPTION OF THE PREFERRED EMBODIMENT

FIG. 4 shows one embodiment of a base station synchronization system [22] according to the invention.

The invention consists in determining the offset between different base stations of the cellular communication network [21] and an external element, the latter being a satellite [17] responsible for "listening to" the signal coming from the various base stations in view as indicated in FIG. 4. Thus the satellite [17] listens to the signals sent by the base stations [16a] and [16b]. The signals are retransmitted (this retransmission can be done transparently, i.e. without any processing on board the satellite) to the satellite receiver antenna [18] tuned to the retransmission frequency of the satellite [17]. The signals are then processed by a processing device [19] on the ground (illustrated by a ground processing center]. The set consisting of the elements {[17], [18], [19]} is synchronous with a reference time system such as the GPS, for example. The method used, depending on the embodiment of the invention, is then as follows:

Search for a frame synchronization word sent in the signal by the base station [16a].

Search for a frame synchronization word sent in the signal by the base station [16b].

Apparent time stamping $T_{16a\text{-}Reception}$ of the synchronization word coming from the base station [16a], and apparent time stamping $T_{16b\text{-}Reception}$ of the synchronization word coming from the base station [16b].

Calculation of the distance between the base station [16a] and the satellite [17]. This calculation assumes that the processing device [19] knows the position of the base station [16a] and the position of the satellite [17].

Calculation of the distance between the base station [16b] and the satellite [17]. In exactly the same way as explained hereinabove, this calculation assumes that the processing device [19] knows the position of the base station [16b] and the position of the satellite [17].

Calculation, by deduction from the distance calculated between the base station [16a] and the satellite [17], of the routing time $T_{16a\text{-}Routing}$ to the satellite [17] of the synchronization word [16a], and calculation, by deduction from the distance calculated between the base station [16b] and the satellite [17], of the routing time $T_{16b\text{-}Routing}$ of the synchronization word [16b].

Calculation of the real TOW of the synchronization word [16a] and of the real TOW of the synchronization word [16b], respectively $T_{16a}=T_{16a\text{-}Reception}-T_{16a\text{-}Routing}$, and $T_{16b}=T_{16b\text{-}Reception}-T_{16b\text{-}Routing}$.

Transmission of information taking account of said real TOW to a synchronization server [20] of the cellular telecommunication network.

The server [20] then has absolute timing information for each base station seen from the satellites.

An essential step of the invention is based on the determination of the TOW of reception of a synchronization word coming from a base station. Each base station is assigned a synchronization channel. Over that synchronization channel is sent repetitively a frame synchronization word together with the identifier of the base station concerned. This information is used by the satellite system: 1) to determine a synchronization TOW, thanks to the frame synchronization word, 2) to discriminate between the base stations, thanks to the identifier of the base station itself.

It is to be noted that the invention may also exploit the fact that the method of the invention involves a step of processing in the processing device [19]. The communication messages themselves may then be used to determine a synchronization TOW corresponding to a given base station but also to determine the identity of the base station. A correlation between the communication messages transmitted and known a posteriori and the messages stored by the satellite [17] may be effected to find a synchronization point in the signal coming from a given base station. The signals transmitted by the base stations [16a] and [16b] (communication messages transmitted by the base stations) can be routed via a terrestrial link to the center [19] which then correlates said messages with the signals received by the satellite [17].

Assuming that the set {satellite [17], antenna [18], ground processing center [19]} has no external time reference like that provided by the GPS, the processing effected by the processing center [19] is as follows:

Search for a frame synchronization word sent in the signal by the base station [16a] to the center [19].

Search for a frame synchronization word sent in the signal by the base station [16b] to the center [19].

Calculation, by deduction from the two synchronization words previously found, of the time difference $\Delta T_{Reception}$ between the appearance of the frame synchronization word [16a] and the appearance of the frame synchronization word [16b].

Calculation of the distance between the base station [16a] and the satellite [17]. This calculation assumes that the processing device [19] knows the position of the base station [16a] and the position of the satellite [17].

Calculation of the distance between the base station [16b] and the satellite [17]. This calculation assumes that the processing device [19] knows the position of the base station [16b] and the position of the satellite [17].

Calculation, by deduction from the preceding two calculations, of the routing time difference $\Delta T_{route}$ to the satellite [17] between the synchronization word [16a] and the synchronization word [16b].

Calculation of the time offset between the base station [16a] and the base station [16b], $\Delta T_{16a\text{-}16b}=\Delta T_{reception}-\Delta T_{route}$.

Transmission of the information $\Delta T_{16a\text{-}16b}$ to the synchronization server [20] of the cellular communication network.

The synchronization server [20] is then in a position to transmit to the terminals of the cellular communication network a synchronization offset information item between the base stations visible from the terminal, which enables it to effect a triangulation on the same signals.

It is to be noted that in the system described hereinabove, the transmissions from the base stations [16a] and [16b] arrive at the satellite highly attenuated because of the distance separating these base stations and the satellite. These transmissions may also interfere with each other because they use the same frequencies. However, the correlation effected at the processing center [19] exploits the fact that the synchronization word and the identity of the base station are repeated regularly. The processing center [19] can then correlate the composite signal retransmitted by the satellite [17] over a plurality of periods to increase the signal to noise ratio after correlation and to discriminate unambiguously the identity and the synchronization of the base station. Obviously, if the processing center [19] were to correlate directly the composite signal retransmitted by the satellite [17] with a communication message chip transmitted by the station, the longer the chip, the greater the discriminatory power.

There is claimed:

1. A method of synchronizing base stations of a terrestrial cellular telecommunication network, the network including at least first and second asynchronous base stations,
   which method includes the following steps:
   a step of said first and second base stations sending to a telecommunication satellite a first message, including a first frame synchronization word and a second message, including a second frame synchronization word,
   a step of retransmission by the satellite to a processing device on the ground of said first and second messages, the satellite and the processing device being synchronous with a reference time system.

2. Method according to claim 1, including a step of transmission by the synchronization device of the cellular telecommunication network to a terminal of the information taking account of said real TOW between the base stations visible from the terminal, enabling the synchronization device to effect a triangulation on the signals emanating from those base stations.

3. The method of claim 1, further comprising:
   the following steps being executed within the processing device:
   a step of searching for the first frame synchronization word sent in the message by the first base station,
   a step of searching for the second frame synchronization word sent in the message by the second base station,
   a step of apparent time stamping $T_{16a\text{-}Reception}$ of the first synchronization word and of apparent time stamping $T_{16b\text{-}Reception}$ of the second synchronization word.

4. The method of claim 3, further comprising:
   a step of calculating the distance between the first base station and the satellite, the processing device knowing the position of the first base station and the position of the satellite,
   a step of calculating the distance between the second base station and the satellite, the processing device knowing the position of the second base station and the position of the satellite.

5. The method of claim 4, further comprising:
   a step of calculation, from the distance calculated between the first base station and the satellite, of the routing time $T_{16a\text{-}Routing}$ to the satellite of the first synchronization word from the first base station to the satellite, and of calculation from the distance calculated between the second base station and the satellite, of the routing time $T_{16b\text{-}Routing}$ of the second synchronization word from the second base station to the satellite.

6. The method of claim 5, further comprising:

a step of calculation of the real Time of Week (TOW) of the first synchronization word and of the real TOW of the second synchronization word, respectively in accordance with the formula $T_{16a}=T_{16a\text{-}Reception}-T_{16a\text{-}Routing}$ and the formula $T_{16b\text{-}Reception}-T_{16b\text{-}Routing}$, a step of transmission of information taking into account said real TOW from the processing device to a synchronization device of the cellular telecommunication network.

\* \* \* \* \*